US008615962B1

(12) United States Patent  (10) Patent No.: US 8,615,962 B1
Perez et al.  (45) Date of Patent:  Dec. 31, 2013

(54) RETENTION FEATURE FOR AUTOMOTIVE DECO TRIM

(71) Applicant: GM Global Technology Operations LLC, Detroit, MI (US)

(72) Inventors: Tito G. Perez, Toluca (MX); Jose Elias Ruede, Toluca (MX)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/740,935

(22) Filed: Jan. 14, 2013

(51) Int. Cl.
*B60R 13/02* (2006.01)

(52) U.S. Cl.
USPC ............. 52/716.7; 52/716.5; 24/292; 24/293; 296/1.08

(58) Field of Classification Search
USPC ............. 52/716.5, 716.6, 716.7; 24/289–297; 428/41; 293/126, 128; 296/209, 1.08
See application file for complete search history.

(56) References Cited

U.S. PATENT DOCUMENTS

| | | | | |
|---|---|---|---|---|
| 3,895,468 A * | 7/1975 | Bernstein | ................ | 52/222 |
| 5,096,753 A * | 3/1992 | McCue et al. | ................ | 428/31 |
| 5,195,793 A * | 3/1993 | Maki | ................ | 293/155 |
| 5,202,172 A * | 4/1993 | Graf | ................ | 428/100 |
| 5,367,751 A * | 11/1994 | DeWitt | ................ | 24/295 |
| 5,639,522 A * | 6/1997 | Maki et al. | ................ | 428/31 |
| 6,135,517 A * | 10/2000 | Cordebar | ................ | 293/155 |
| 6,276,109 B1 * | 8/2001 | Hingorani et al. | ................ | 52/716.5 |
| 6,592,164 B2 * | 7/2003 | Nagae et al. | ................ | 296/29 |
| 6,863,327 B2 * | 3/2005 | Granger et al. | ................ | 296/1.08 |
| 6,910,722 B2 * | 6/2005 | Takeda et al. | ................ | 293/128 |
| 7,040,682 B2 * | 5/2006 | Tokumoto et al. | ................ | 296/1.08 |
| 7,047,224 B1 * | 5/2006 | Neuneier et al. | ................ | 706/12 |
| 7,140,079 B2 * | 11/2006 | Nishimura et al. | ................ | 24/289 |
| 7,165,371 B2 * | 1/2007 | Yoyasu | ................ | 52/716.5 |
| 7,523,982 B2 * | 4/2009 | Yamaguchi | ................ | 296/209 |
| 7,900,953 B2 * | 3/2011 | Slobodecki et al. | ................ | 280/728.2 |
| 8,038,167 B2 * | 10/2011 | Slobodecki et al. | ................ | 280/728.2 |
| 8,327,600 B2 * | 12/2012 | Stepan | ................ | 52/716.6 |
| 8,414,048 B1 * | 4/2013 | Kwolek | ................ | 296/24.34 |
| 2004/0061348 A1 * | 4/2004 | Takeda et al. | ................ | 296/1.08 |

FOREIGN PATENT DOCUMENTS

JP 08238934 A * 9/1996

* cited by examiner

*Primary Examiner* — Jeanette E. Chapman
(74) *Attorney, Agent, or Firm* — Quinn Law Group, PLLC

(57) ABSTRACT

A retention feature for securing a trim component to a panel of an automotive vehicle includes an elongate clip extending from the trim component and a selectively releasable locking device disposed on the panel. The clip is configured to be inserted through an opening defined by the panel. The locking device includes: a restraining portion on a first side of the panel; an actuating portion on a second side of the panel; and a biasing feature configured to compliantly bias the restraining portion into the locked state. The restraining portion of the locking device obstructs the withdrawal of the elongate clip from the panel when in a locked state, and is configured to transition from the locked state to an unlocked state in response to the application of a force to the actuating portion.

20 Claims, 4 Drawing Sheets

RETENTION FEATURE FOR AUTOMOTIVE DECO TRIM

TECHNICAL FIELD

The present invention relates generally to compliant retention features for securing automotive trim components.

BACKGROUND

In an automotive vehicle, aesthetically pleasing trim components may be affixed to structural components of the vehicle to provide a desirable vehicle appearance. The trim components may have a stylized outer finish to provide a surface with a predetermined color and/or surface finish. Trim components may be affixed to the interior and/or exterior of the vehicle, and may include, for example, panels or appliqués affixed to the interior of vehicle door panels or instrument panel. As may be appreciated, it is desirable for any affixed panel to not unintentionally detach from the vehicle.

SUMMARY

A retention feature for securing a trim component to a panel of an automotive vehicle includes an elongate clip extending from the trim component and configured to be inserted through an opening defined by the panel. The retention feature further includes a selectively releasable locking device configured to transition between a locked state and an unlocked state and is configured to obstruct the withdrawal of the elongate clip from the panel when in the locked state.

The elongate clip includes a proximal end portion secured to the trim component; a distal end portion including a retaining feature. The selectively releasable locking device includes a restraining portion disposed on a first side of the panel, an actuating portion disposed on a second side of the panel, and a biasing feature integrally formed into the locking device and configured to compliantly bias the restraining portion into the locked state. The restraining portion is configured to transition from the locked state to the unlocked state in response to the application of a force to the actuating portion.

The restraining portion of the locking device is configured to obstruct the withdrawal of the elongate clip through the opening by physically interfering with the passage of the retaining feature through the opening. The elongate clip may be configured to be inserted through the opening such that the trim component abuts the second side of the panel. As such, the actuating portion of the locking device may be disposed between the panel and the trim component such that the panel covers the actuating portion.

In one configuration, the restraining portion of the locking device includes a slide block disposed on the first side of the panel, with the slide block being translatable along the panel. The slide block is then configured to cover a portion of the opening when in the locked state such that the retaining feature of the elongate clip is obstructed from passing through the opening. The biasing feature may then include a compliant spring formed into the slide block and configured to exert a biasing force against a feature extending from the panel. The biasing force would be configured to urge the slide block into the locked state. The slide block may further include a protrusion extending through the panel, and the protrusion may define the actuating portion of the locking device.

In another configuration, the locking device includes a lever extending through the panel. The lever defines the restraining portion of the locking device on the first side of the panel, and defines the actuating portion of the locking device on the second side of the panel. The biasing feature may be a compliant hinge that joins the lever to the panel, and the lever may be configured to transition between the locked state and the unlocked state by rotating about the biasing feature.

The above features and advantages and other features and advantages of the present invention are readily apparent from the following detailed description of the best modes for carrying out the invention when taken in connection with the accompanying drawings.

DETAILED DESCRIPTION

Figure 1:
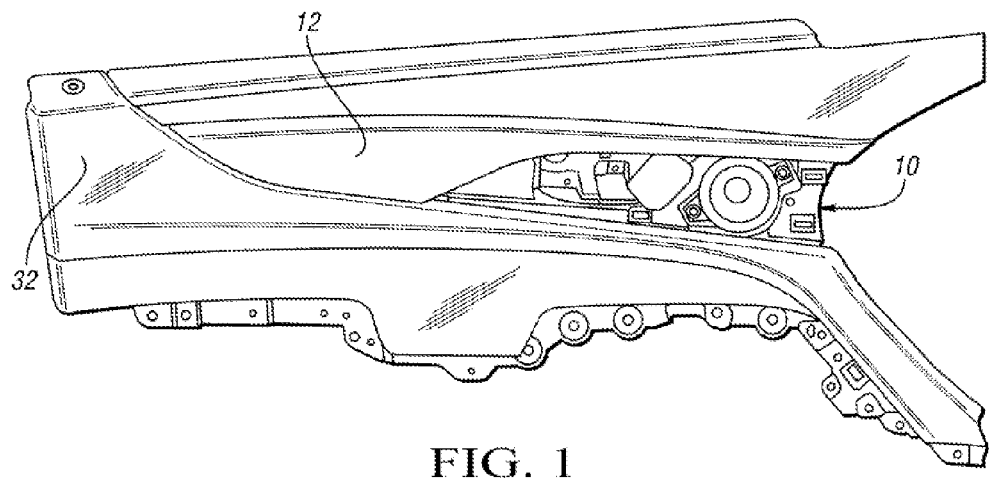
FIG. 1 is a schematic side view of an automotive trim component attached to a door panel.
Figure 2:
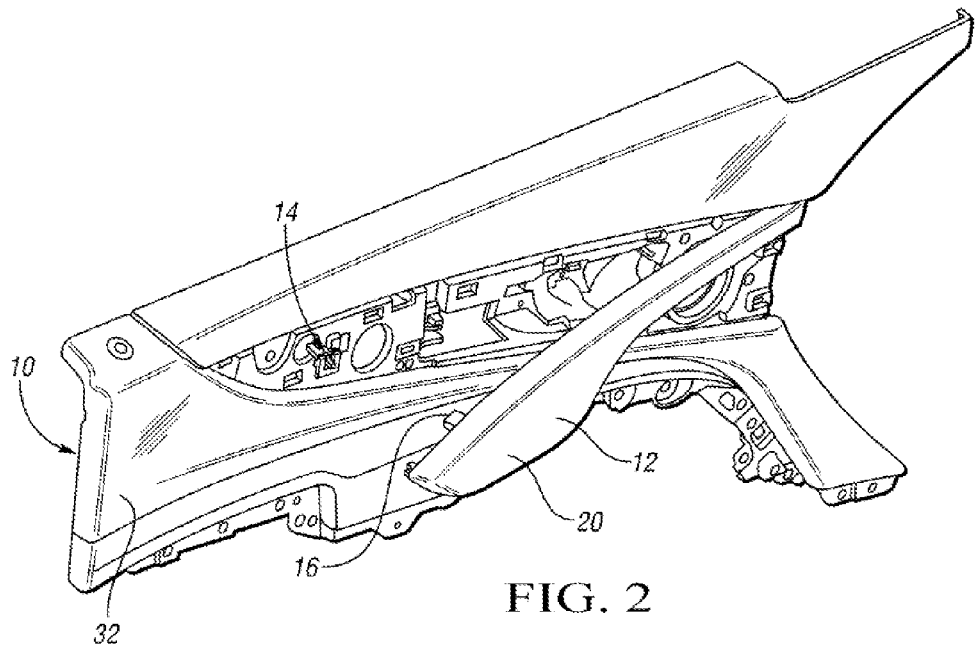
FIG. 2 is a schematic isometric view of the trim component of FIG. 1 released from the door panel.

Referring to the drawings, wherein like reference numerals are used to identify like or identical components in the various views, FIG. 1 schematically illustrates an automotive door panel 10 having a removable trim component 12 affixed to the panel 10. Similarly, FIG. 2 illustrates the same door panel 10, with the trim component 12 detached from the panel 10. As will be discussed in greater detail below, the door panel 10 may include a restraining feature (generally at 14) that may selectively receive an elongate clip 16 extending from the trim component 12. At the urging of a user, the restraining feature 14 may selectively release the trim component 12 to permit the replacement or interchanging of the trim component 12 within the automotive vehicle. By providing a robust attachment mechanism, trim components may be intentionally removed, however, unintentional removal may be prevented.

Figure 3:
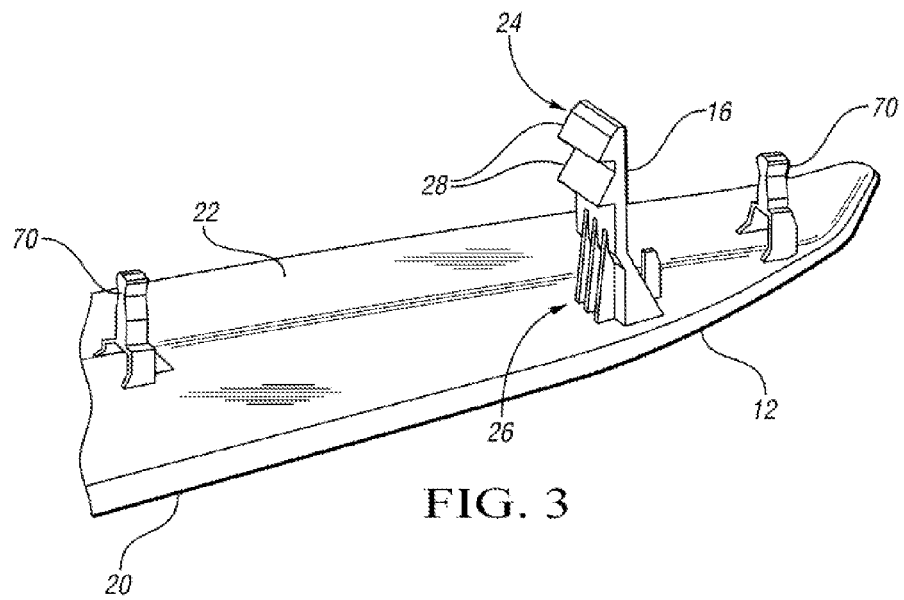
FIG. 3 is a schematic isometric view of an elongate clip disposed on a reverse side of an automotive trim component.

FIG. 3 illustrates a trim component 12 that includes a trim side 20 and an attachment side 22. An elongate clip 16 may extend from the attachment side 22, and may generally include a distal end portion 24 and a proximal end portion 26. The clip may be affixed to the trim component 16 at the proximal end portion 26, and may include one or more retaining features 28 at the distal end portion 24. As shown, the retaining features 28 may transversely extend out from a side of the clip 16. In one configuration, the retaining features 28 may be wedge-shaped, with the proximal end of the feature 28 protruding further from the clip 16 than the distal end of the feature 28. As may be appreciated, a wedge-shaped configuration may provide for easier installation of the clip 16 within the restraining feature 14.

Figure 4:
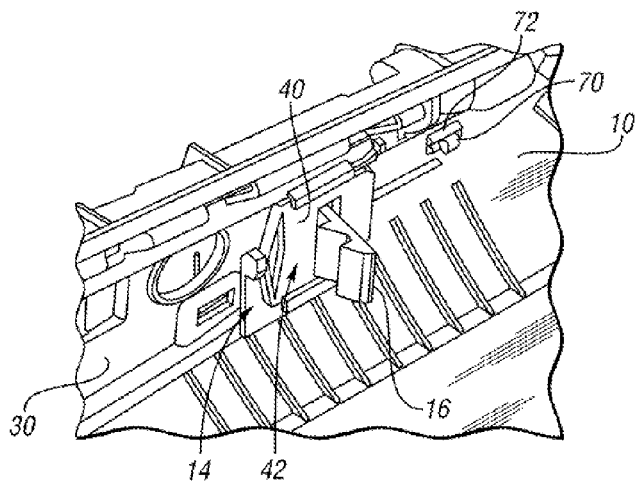
FIG. 4 is a schematic isometric view of a first embodiment of a retention feature for securing a trim component to a panel of an automotive vehicle.
Figure 5:
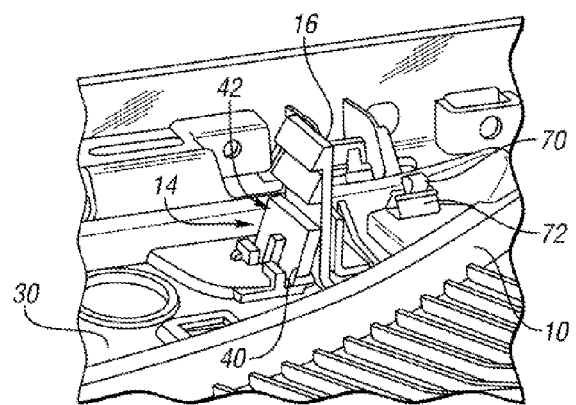
FIG. 5 is a schematic isometric view of a second embodiment of a retention feature for securing a trim component to a panel of an automotive vehicle.

FIGS. 4 and 5 generally illustrate two embodiments of the restraining feature 14 that may be operative to receive the elongate clip 16 and prevent it from unintentional withdrawal. Both FIG. 4 and FIG. 5 generally illustrate a reverse side of the door panel 10 illustrated in FIGS. 1 and 2. Said another way, FIGS. 4 and 5 illustrate an inner side 30 (i.e., a first side 30) of the door panel 10, and FIGS. 1 and 2 illustrate an outer side 32 (i.e., a second side 32) of the door panel 10 that is opposite the inner side 30. The outer side 32 of the door panel 10 may generally face into the passenger compartment of the vehicle, while the inner side 30 may generally face toward the interior portion of the door. In this manner, the trim component 12 may abut the outer side 32 of the door panel 10, as shown in FIGS. 1 and 2.

Figure 6:
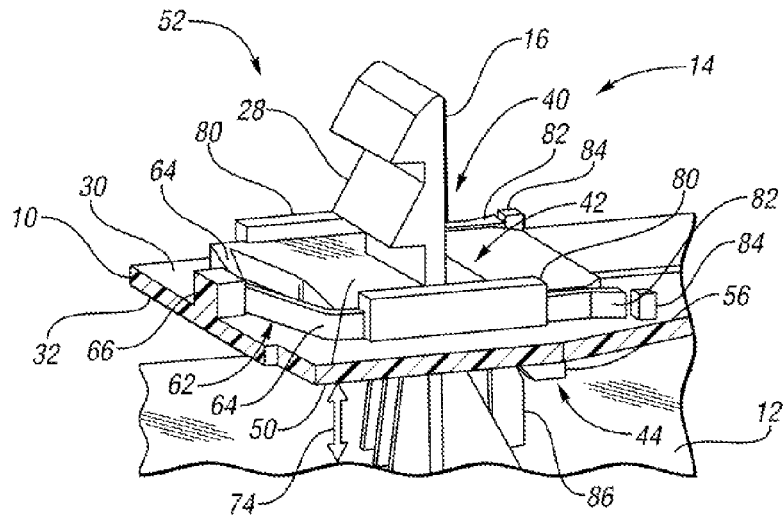
FIG. 6 is a schematic partial cross-sectional view of the retention feature of FIG. 4 in a first locked state.
Figure 7:
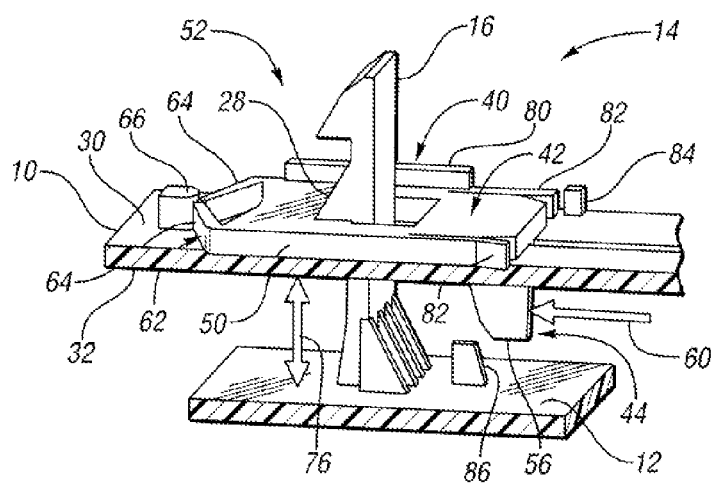
FIG. 7 is a schematic partial cross-sectional view of the retention feature of FIG. 4 in a second locked state.
Figure 8:
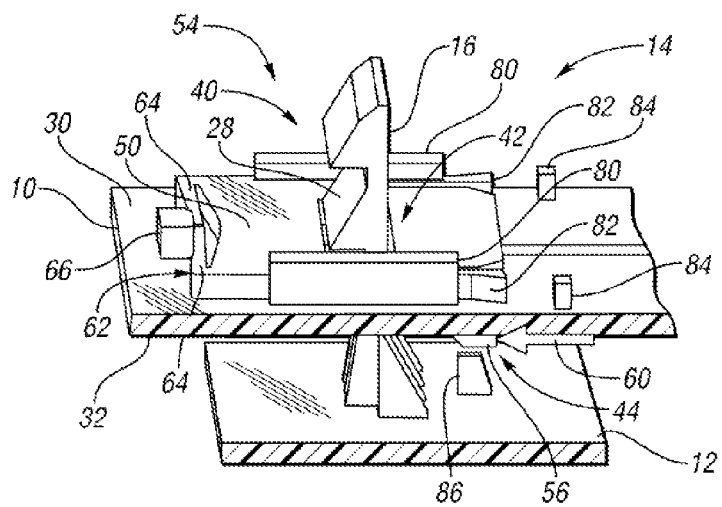
FIG. 8 is a schematic partial cross-sectional view of the retention feature of FIG. 4 in an ulocked state.

In each embodiment provided in FIGS. 4 and 5, the restraining feature 14 includes a locking device 40 partially disposed on the inner side 30 of the panel 10. As will be discussed in greater detail below, the locking device 40 is configured to selectively transition between a locked state and an unlocked state. When in the locked state, a restraining portion 42 of the locking device 42 is configured to obstruct the withdrawal of the elongate clip 16 from the panel 10. Conversely, when the locking device 40 is in the unlocked state, the restraining portion 42 is configured to permit withdrawal of the elongate clip 16 from the panel 10. FIGS. 6-8 further illustrate the operation of the locking device 40 provided in FIG. 4, and FIGS. 9-11 further illustrate the operation of the locking device 40 provided in FIG. 5.

As generally shown in FIGS. 6-8, the locking device 40 may include a restraining portion 42 disposed on an inner side 30 of the panel 10, and may include an actuating portion 44 disposed on an outer side 32 of the panel. In one configuration the restraining portion 42 may include slide block 50 that is translatable along the panel 10 between the locked state 52 (shown in FIGS. 6 and 7) and the unlocked state 54 (shown in FIG. 8). When in the locked state 52, a portion of the slide block may cover a portion of the opening in the panel through which the clip 16 passes. As such the one or more retaining features 28 of the elongate clip 16 may be obstructed from passing through the opening by the slide block 50 (e.g., such as shown in FIG. 7).

To facilitate the selective releasing of the locking device 40, the slide block 50 may include a protrusion 56 or tab that extends through an opening in the panel 10 such that it protrudes from the outer side 32 of the panel 10. The protrusion 56 may define the actuating portion 44 of the locking device 40. To transition the slide block 50 from the locked state 52 to the unlocked state 54, a user may apply a force 60 to the protrusion 56, such as shown in FIG. 7. The force 60 will urge the slide block 50 to translate along the panel 10 to an unlocked state 54, such as shown in FIG. 8, where the clip 16 may then be withdrawn from the panel 10.

The locking device 40 may further include a biasing feature 62 that may be integrally formed into the restraining portion 42 and may be configured to compliantly bias the restraining portion 42 into the locked state 52. The term "compliantly bias" is intended to mean that the biasing feature may apply a biasing force solely through elastic body deformation. Likewise, by "integrally formed" it is contemplated that the biasing feature 62 may be formed through the same process used to form the remainder of the restraining portion 42. For example, the biasing feature 62 may be integrally formed into the slide block 50 by injection molding the slide block 50 and biasing feature 62 at the same time and/or using the same mold. The compliant, integrally formed design may promote cost savings and/or increase reliability over designs using separate spring elements. As shown in FIGS. 6-8, in one configuration, the biasing feature 62 may include one or more compliant arms 64 that extend from the slide block 50 and are configured to contact and apply a force against a feature 66 of the panel 10.

As generally illustrated in FIGS. 6-8, the actuating portion 44 of the locking device 40 may be substantially disposed between the outer side 32 of the panel 10 and the trim component 12. As such, from the interior of the vehicle, the trim component 12 may substantially cover the actuating portion 44 of the locking device 40.

In one configuration, the locking device 40 described above may be a secondary or redundant retention feature that is configured to robustly hold the trim component 12 to the panel 10 in the event a primary retention feature becomes disengaged. For example, referring again to FIG. 3, the trim component 12 may include one or more retaining posts 70 that may protrude from the attachment side 22 of the trim component 12. As generally illustrated in FIGS. 4 and 5, each post 70 may fit within a corresponding clip 72 in the panel 10 to securely affix the trim component 12 to the panel 10. The posts/clips 70,72 may serve as the primary fastening means for affixing the trim component to the panel 10. As such, when the posts 70 are engaged in the clips 72, the trim component 12 may be held at a first distance 74 from the panel 10. This first distance 74 may give the appearance to a vehicle occupant that the trim component 12 is snuggly adhered to the panel 10 with little or no gaps being visible around the periphery of the component 12. As generally illustrated in FIGS. 4-6, when in this configuration with the primary fastening means engaged, the retaining features 28 of the clip 16 may be spaced away from the restraining portion 42 of the locking device 40.

If the primary fastening means should become disengaged, either intentionally or unintentionally, the trim component 12 may separate from the panel 10 until the retaining feature 28 of the clip 16 contacts the restraining portion 42 of the locking device 40, such as shown in FIG. 7. In this configuration, the trim component 12 may be held at a second distance 76 from the panel 10, which is greater than the first distance 74. The trim component 12 may then only be entirely removed from the panel 10 by applying an unlocking force 60 to the actuating portion 44 of the locking device 40, such as shown in FIG. 8. This may require a technician to reach under/behind the trim component 12 (from the periphery of the component 12) with a finger or tool to contact the actuating portion 44 of the locking device 40.

As generally illustrated in FIGS. 6-8, the slide block 50 may be disposed within a pair of opposing guides 80 that may retain the slide block 50 against the inner side 30 of the panel 10. The guides 80 may permit the slide block 50 to translate in a single direction along the panel 10, though may restrain the slide block 50 against any other motion.

The slide block 50 may further include one or more retaining clips 82 that may restrain the slide block 50 from being unintentionally withdrawn from the guides 80. In one configuration, the retaining clips 82 may be compliant clips that are integrally formed with the slide block 50. During installation, the clips may deform inward toward the body of the slide block 50. Once past a retaining feature 84 of the panel 10, the clips 82 may restore to their undeformed position, whereby they would contact the retaining feature 84 if removal was attempted.

In one configuration, the trim component 12 may include a tab 86 that extends out from the attachment side 22 of the trim component 12. The tab 86 may be positioned and dimensioned such that it may prevent the locking device 40 from transitioning to an unlocked state when the trim component 12 is secured by the primary fastening means (i.e., when the trim component 12 is held at the first distance 74 from the panel 10). The tab 86 may operate by physically contacting and/or interfering with the motion of the actuating portion 44 of the locking device 40.

The present attachment design is advantageous over other attachment means, such as screws or rivets, because it provides the ability to detach the trim component from the panel via the outside of the door (i.e., within the passenger space of the vehicle). This is remarkably different from other attachment means that require the entire door to be disassembled to unfasten screws from the reverse/interior portion of the door panel. Additionally, the present attachment design provides an increased level of robustness over merely using posts/clips, as it is not as readily detached through inadvertent or unintentional means. In this manner, the present design provides increased serviceability and/or increased robustness over other attachment means such as screws or clips.

Figure 9:
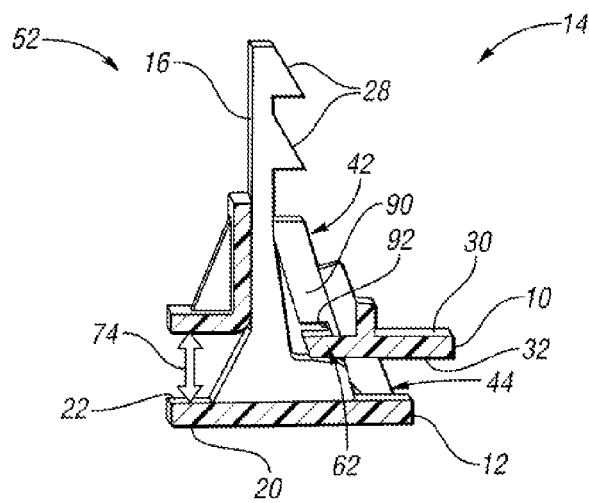
FIG. 9 is a schematic partial cross-sectional view of the retention feature of FIG. 5 in a first locked state.
Figure 10:
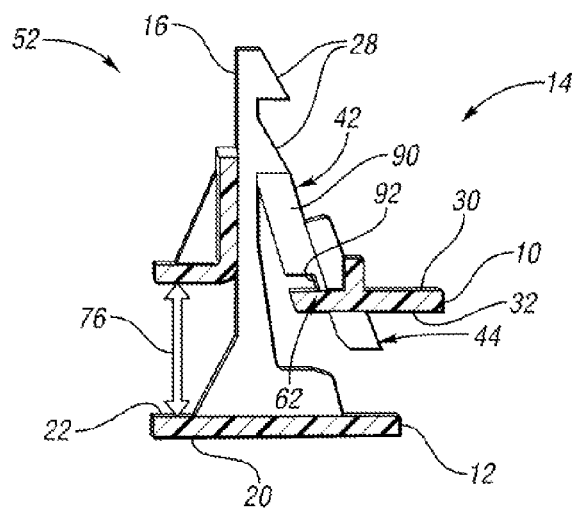
FIG. 10 is a schematic partial cross-sectional view of the retention feature of FIG. 5 in a second locked state.
Figure 11:
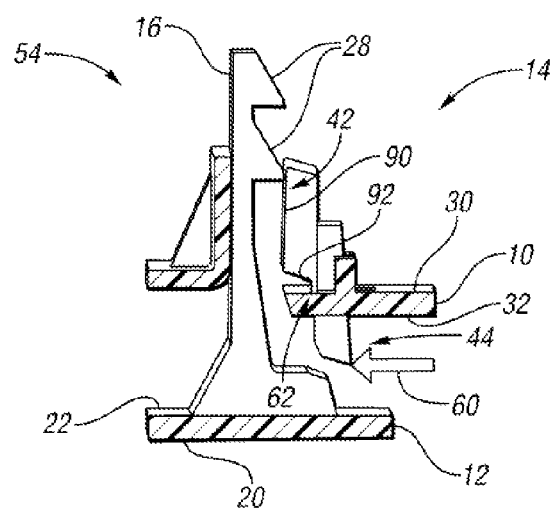
FIG. 11 is a schematic partial cross-sectional view of the retention feature of FIG. 5 in an unlocked state.

In another configuration, such as generally illustrated in FIG. 5 and schematically in FIGS. 9-11, the locking device 40 may include a lever 90 that extends through the panel 10. The lever 90 may define the restraining portion 42 of the locking device 40 on the inner side 30 of the panel 10, and may define the actuating portion 44 of the locking device on the outer side 32 of the panel 10.

The lever 90 may be configured to transition between a locked state 52, such as generally shown in FIGS. 9 and 10, and an unlocked state 54, such as generally shown in FIG. 11. When in the locked state 52, the lever 90 may contact a portion of the elongate clip 16, and may obstruct the one or more retaining features 28 of the elongate clip 16 from passing beyond the restraining portion 42 of the lever 90 and through the opening in the panel 10.

The lever 90 may be joined to the panel 10 through a compliant hinge 92 that may be integrally formed with the lever 90 and a portion of the panel 10. As may be appreciated, the lever 90 may thus be configured to transition between the locked state and the unlocked state by rotating about the compliant hinge 92. The compliant hinge 92, sometimes also referred to as a "living hinge," may be further configured to bias the lever 90 into the locked state 52, and thus may serve a similar purpose as the biasing feature 62 described above.

FIGS. 9-11 are similar to FIGS. 6-8, in that they respectively illustrate the trim component 12 and locking device 40 in three positions. In FIGS. 6 and 9, the trim component 12 is closely abutted to the panel 10, such as if restrained by a primary restraining feature. In this state, the actuating portion 44 of the locking device 40 may be contacted or restrained by a protrusion or land extending from the trim component 12. Likewise, the restraining portion 42 of the locking device 40 may be disposed in a locked state 52.

In FIGS. 7 and 10, the trim component 12 has transitioned away from the panel 10, for example, as if the primary restraining means has become disengaged. In this state, a retaining feature 28 of the elongate clip 16 contacts the restraining portion 42 of the locking device 40, which obstructs the clip 16 from withdrawing from the panel 10. In FIGS. 7 and 10, the locking device 40 is biased into a locked state 52 via the biasing feature, though is not prevented from transitioning to an unlocked state 54 via the protrusion on the trim component 12.

In FIGS. 8 and 11, a force 60 has been applied to the actuating portion 44 of the locking device 40. The force 60 is sufficient to overcome any biasing force that may be present, and to transition the locking device from the locked state 52 to the unlocked state 54. In the unlocked state 54, the restraining portion 42 of the locking device 40 no longer obstructs or interferes with the retaining feature 28 of the elongate clip 16, and the clip is permitted to be withdrawn from the panel 10.

In both configurations, the unlocking force 60 is applied from the outer side of the panel 10, such that a user may selectively release the trim component 12 from the panel 10 by merely reaching under the periphery of the component and toggling the locking device 40.

While the present description describes the retention feature with respect to attaching a trim component 12 to a door panel 10, it may similarly be used to attach a trim component to an instrument panel, a dashboard panel, or any other panel within an automotive vehicle (interior or exterior), or with other non-automotive technologies. Additionally, while the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A trim attachment assembly for securing a trim component to a panel of an automotive vehicle, the trim attachment assembly comprising:
   a panel defining an opening and having a first side and a second side opposite the first side;
   an elongate clip extending from the trim component and configured to be inserted through the opening defined by the panel, the elongate clip including:
      a proximal end portion secured to the trim component; and
      a distal end portion including a retaining feature;
   a selectively releasable locking device configured to transition between a locked state and an unlocked state, the locking device including:
      a restraining portion disposed on the first side of the panel;
      an actuating portion disposed on the second side of the panel; and
      a biasing feature integrally formed into the locking device and configured to compliantly bias the restraining portion into the locked state;
      wherein the restraining portion is configured to transition from the locked state to the unlocked state in response to the application of a force to the actuating portion;
   wherein the restraining portion of the locking device is configured to obstruct the withdrawal of the elongate clip from the panel when in the locked state, and is configured to permit withdrawal of the elongate clip from the panel when in the unlocked state.

2. The assembly of claim 1, wherein the restraining portion of the locking device is configured to obstruct the withdrawal of the elongate clip through the opening by physically interfering with the passage of the retaining feature through the opening.

3. The assembly of claim 1, wherein the elongate clip is configured to be inserted through the opening such that the trim component abuts the second side of the panel.

4. The assembly of claim 3, wherein the actuating portion of the locking device is disposed between the panel and the trim component such that the panel covers the actuating portion.

5. The assembly of claim 1, wherein the restraining portion of the locking device includes a slide block disposed on the first side of the panel, and translatable along the panel; and wherein the slide block is configured to cover a portion of the opening when in the locked state such that the retaining feature of the elongate clip is obstructed from passing through the opening.

6. The assembly of claim 5, wherein the panel includes a feature extending from the first side; and wherein the biasing feature includes a compliant spring formed into the slide block and configured to exert a biasing force against the feature to urge the slide block into the locked state.

7. The assembly of claim 5, wherein the slide block includes a protrusion extending through the panel; and wherein the protrusion defines the actuating portion of the locking device.

8. The assembly of claim 1, wherein the locking device includes a lever extending through the panel, the lever defining the restraining portion of the locking device on the first side of the panel, and the lever defining the actuating portion of the locking device on the second side of the panel;

wherein the biasing feature is a compliant hinge that joins the lever to the panel; and wherein the lever is configured to transition between the locked state and the unlocked state by rotating about the biasing feature.

9. The assembly of claim 1, wherein the elongate clip and selectively releasable locking device are a secondary retention feature configured to selectively retain the trim component at a first distance from the panel;

wherein the trim component further includes a primary retention feature configured to selectively retain the trim component at a second distance from the panel; and wherein the second distance is less than the first distance.

10. The assembly of claim 9, wherein the trim component includes a tab extending out from the trim component; and wherein the tab is configured to prevent the locking device from transitioning to an unlocked state when the trim component is disposed at the second distance from the panel.

11. The assembly of claim 1, wherein the retaining feature of the elongate clip includes a protrusion extending out transversely from a side of the elongate clip.

12. A retention feature for securing a trim component to a panel of an automotive vehicle defining an opening, the retention feature comprising:

an elongate clip extending from the trim component and configured to be inserted through the opening defined by the panel, the elongate clip including:
a proximal end portion secured to the trim component; and
a distal end portion including a retaining feature;

a selectively releasable locking device configured to transition between a locked state and an unlocked state, the locking device including:
a lever defining a restraining portion and an actuating portion;
a compliant hinge coupling the lever with the panel;
wherein the lever is configured to transition between the locked state and the unlocked state by rotating about the compliant hinge;
wherein the compliant hinge is configured to compliantly bias the restraining portion into the locked state; and
wherein the restraining portion of the lever is configured to transition from the locked state to the unlocked state in response to the application of a force to the actuating portion of the lever; and wherein the restraining portion of the lever is configured to obstruct the withdrawal of the elongate clip from the panel when in the locked state, and is configured to permit withdrawal of the elongate clip from the panel when in the unlocked state.

13. The retention feature of claim 12, wherein the restraining portion of the locking device is configured to obstruct the withdrawal of the elongate clip through the opening by physically interfering with the passage of the retaining feature through the opening.

14. The retention feature of claim 12, wherein the elongate clip is configured to be inserted through the opening such that the trim component is more proximate to the actuating portion than the restraining portion.

15. The retention feature of claim 14, wherein the actuating portion of the locking device is disposed between the panel and the trim component such that the panel covers the actuating portion.

16. A trim attachment assembly for securing a trim component to a panel of an automotive vehicle, the trim attachment assembly comprising:

a panel defining an opening and having a first side and a second side opposite the first side;

an elongate clip extending from the trim component and configured to be inserted through the opening defined by the panel, the elongate clip including:
a proximal end portion secured to the trim component; and
a distal end portion including a retaining feature;

a selectively releasable locking device configured to transition between a locked state and an unlocked state, the locking device including:
a restraining portion disposed on the first side of the panel, the restraining portion including a slide block translatable along the panel;
an actuating portion disposed on the second side of the panel, the actuating portion including a protrusion that extends from the slide block through the panel; and
a biasing feature integrally formed into the slide block and configured to compliantly bias the slide block into the locked state;
wherein the slide block is configured to transition from the locked state to the unlocked state in response to the application of a force to the protrusion;

wherein the slide block is configured to cover a portion of the opening when in the locked state such that the retaining feature of the elongate clip is obstructed from passing through the opening, and is configured to uncover the portion of the opening to permit withdrawal of the elongate clip from the panel when in the unlocked state.

17. The assembly of claim 16, wherein the panel includes a feature extending from the first side; and wherein the biasing feature includes a compliant spring formed into the slide block and configured to exert a biasing force against the feature of the panel to urge the slide block into the locked state.

18. The assembly of claim 16, wherein the restraining portion of the locking device is configured to obstruct the withdrawal of the elongate clip through the opening by physically interfering with the passage of the retaining feature through the opening.

19. The assembly of claim 16, wherein the elongate clip is configured to be inserted through the opening such that the trim component abuts the second side of the panel.

20. The assembly of claim 19, wherein the actuating portion of the locking device is disposed between the panel and the trim component such that the panel covers the actuating portion.

\* \* \* \* \*